United States Patent

[11] 3,614,137

| [72] | Inventor | Irvin D. Jacobson<br>Cleveland, Ohio |
|---|---|---|
| [21] | Appl. No. | 27,021 |
| [22] | Filed | Apr. 9, 1970 |
| [45] | Patented | Oct. 19, 1971 |
| [73] | Assignee | Perfection Corporation<br>Madison, Ohio |

[54] REINFORCED PLASTIC FITTING
5 Claims, 5 Drawing Figs.

[52] U.S. Cl. .................................................. 285/390,
138/174, 285/417, 285/423
[51] Int. Cl. .................................................. F16l 15/00
[50] Field of Search........................................... 285/21,
244, 331, 252, 355, 369, 390, 417, 423, 174, 239;
138/104, 153, 172, 173, 174

[56] References Cited
UNITED STATES PATENTS

| 2,299,172 | 10/1942 | Muller.................... | 285/239 X |
| 2,447,697 | 8/1948 | Gotschall................ | 285/244 |
| 2,785,911 | 3/1957 | Kaufman................. | 285/260 X |
| 2,804,320 | 8/1957 | Pearson.................. | 285/355 X |
| 2,848,015 | 8/1958 | Roberts et al............ | 285/252 |
| 3,039,795 | 6/1962 | Reuter................... | 285/423 X |

*Primary Examiner*—Dave W. Arola
*Attorney*—Fay, Sharpe and Mulholland

ABSTRACT: Disclosed is a reinforced plastic fitting including a sleeve member having connection means at either end. A fluid passageway extends through the sleeve member. An internal elongated longitudinally extending recess is provided in the sleeve at each end thereof. The recess is defined by radially spaced cylindrical surfaces coaxial with the axis about which the respective ends of the sleeve are defined. A radial end wall connects the respective cylindrical surfaces and defines a bottom for each recess. The opposite end of each recess is open in order to receive a rigid generally annular reinforcing insert of metal or plastic. A flap is formed adjacent the open end of each respective recess whereby after insertion of the reinforcing insert in the recess, the flap may be folded over the recess and the reinforcing insert to thereby encase the insert in the fitting end.

3,614,137

PATENTED OCT 19 1971

INVENTOR.
IRVIN D. JACOBSON

BY
Fay, Sharpe & Mulholland
ATTORNEYS.

REINFORCED PLASTIC FITTING

BACKGROUND OF THE INVENTION

Tube and pipe fittings of nonmetallic materials are being utilized in ever-increasing numbers and applications. The lower costs attendant to the manufacture of nonmetallic fluid system components is a prime factor to which their rather sizable industrial and commercial success may be attributed. Moreover, the corrosion-resistant properties exhibited by most nonmetallic materials such as plastics have been an attractive feature to component users. A major obstacle, however, to the complete acceptance of these fittings has been their limited versatility in certain applications.

Some prior art devices have suggested the use of a metallic reinforcement member in some way associated with a plastic fitting to give added support to the fitting thus to avoid some of the inherent problems noted above. However, the combination of a plastic fitting with a metallic reinforcing member, as taught by the prior art, has usually left the metallic reinforcing member exposed to the fluid and/or gas in the system. This, of course, causes varying degrees of corrosion of the metallic reinforcement member and/or contamination of the fluid or gas in the system. A common cause of such contamination is a chemical reaction taking place between the fluid or gas in the system and the reinforcing member with subsequent release of impurities into the system. Obviously this contamination negates the attractive corrosion-resistant qualities of plastic components.

SUMMARY OF THE INVENTION

This invention contemplates a plastic fitting reinforced by an embedded substantially rigid metallic insert.

The end portion of the fitting intended to be used as a seal is most generally of smallest wall thickness compared to other parts or portions of to: fitting. It is this area which is most susceptible to: (1) expansion at high system pressures or temperatures; (2) radial compression because of connection with and tightening of other fittings: and (3) contraction at low system temperatures. Moreover, these phenomena are least tolerable in the end portion because it is this area upon which reliance is placed for fluid sealing and which is also structurally the weakest.

According to the present invention, a plastic fitting is provided having a fluid passageway therethrough. At least one end of the fitting is provided with connection means either externally or internally of the sleeve for connection to another component. The wall of the fitting is provided with an internal elongated recess underlying the connection means and coaxial with the axis about which the connection means are formed, and initially opening at one end to the exterior of the fitting. The fitting wall is so configured as to provide, at the latter end, a circumferential flap or tab for a purpose to be later described.

Into the recess thus provided is placed a substantially rigid metallic reinforcing member or insert, complementary in shape to the recess. The only limitations of the metallic member and its construction are the strength of the metal used and/or the pressure and/or temperature extremes to which the fitting wall is to be subjected. Therefore, for example, either a continuous or relieved insert may be used. The metal insert may be smooth or have a threaded form.

After insertion of the reinforcing member into the recess, the circumferential flap or tab is folded over the recess to close the same and encapsulate the insert.

After the folding operation is complete, the metallic reinforcement member is thus completely encased or embedded within the fitting end. Thereafter, the insert will reinforce and limit radial expansion, contraction or compression of the fitting end. Further, the insert is sealed off from contact with corrosive influences and cannot contaminate the contents of the system. Likewise, the system cannot corrode the insert.

DESCRIPTION OF THE PREFERRED EMBODIMENTS

Figure 1:
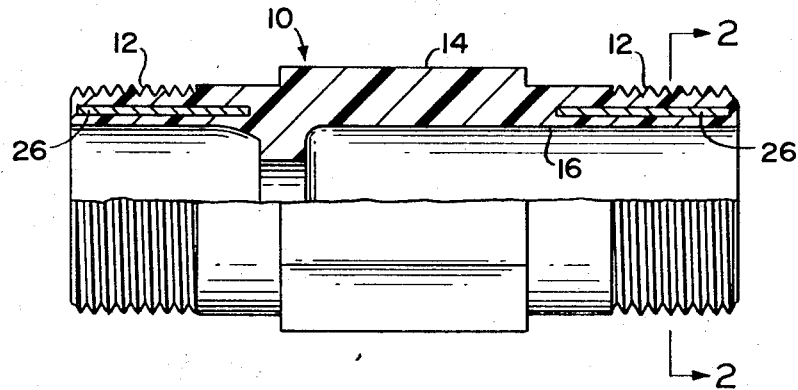
FIG. 1 is a side elevational view, in partial longitudinal section, of a plastic fitting having connection means in the form of threaded ends which incorporate the principles of the invention.
Figure 3:
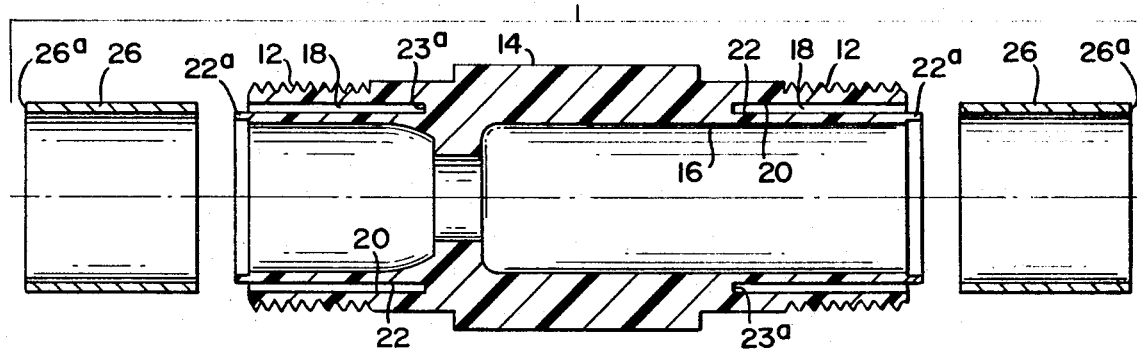
FIG. 3 is an exploded view of the fitting in longitudinal section, and showing the inserts before placement in the recesses.
Figure 4:
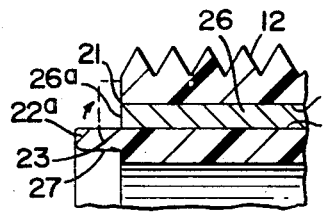
FIG. 4 is a fragmentary view of the fitting in enlarged scale.
Figure 5:
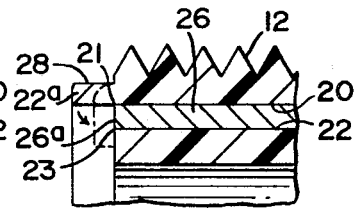
FIG. 5 is a fragmentary view, in enlarged scale and showing a modified flap arrangement.

FIG. 1 shows a plastic fitting in the form of a sleeve 10 having connection means in the form of threaded ends 12. It should be understood that the invention in equally adaptable to other fitting conformations including connection means in the form of smooth tapered ends. Sleeve 10 also has a hex-shaped central section 14 which may serve as a tool pad arrangement. Fluid passageway 16 extends through the length of the sleeve 10, and the threaded ends 12 are adapted for connection of the passageway to other components. The wall of the fitting is provided at each threaded end with an internal elongated longitudinally extending recess 18 (FIG. 3), coaxial with the axis about which the respective threads are formed. Each recess 18 underlies (or, in the case of female threads, overlies) a respective thread 12, and will ordinarily be annular in conformation. In such a case, recess 18 is defined by radially spaced coaxial cylindrical surfaces 20 and 22 respectively, having axial outer termini 21 and 23 respectively (FIGS. 4 and 5). Radial end wall 23a connects the axial inner ends of surfaces 20 and 22 and serves as a bottom for the recess.

Adjacent the open end of the recess 18, the wall of the fitting is provided with an integral axially extending circumferential flap 22a of a length somewhat greater in magnitude than the radial spacing between surfaces 20 and 22. In the embodiment of FIGS. 1-4, the flap is formed as a continuation of the portion of the fitting wall defining surface 22. As seen in FIG. 5, however, the flap may also be provided by extending axially the portion of the fitting wall which defines surface 20. In some cases it may be desirable to reduce the thickness of the flap somewhat relative to the thickness of the fitting wall portion from which it extends. This may be accomplished for example, by use of a counterbore such as that shown at 27 in FIG. 4, or by reducing the outside diameter of the fitting as at 28 in FIG. 5.

Each insert 26 is positioned in a corresponding recess 18 so that its outer end 26a is flush (but for flap 22a) with the axially outer terminus of threaded end 12. The flap 22a is then folded over the recess 18 and insert 26 into engagement with the terminus of that portion of the fitting end on the opposite side of recess 18. This folding operation may be performed using any suitable tool or tool-and-heat combination which will cause the flap to soften and therefore easily fold in the desired direction (see arrows in FIGS. 4 and 5). It is desirable to perform the operation under such conditions as to cause the free end portion of the flap, once bent, to become fused to the remainder of the fitting, in that this produces a good seal against the ingress of fluids into the recess 18.

Figure 2:
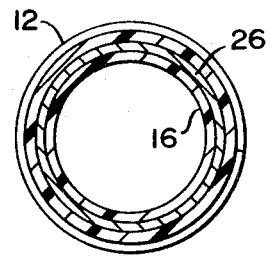
FIG. 2 is a cross-sectional view of the fitting taken along line 2—2 of FIG. 1.

As illustrated in FIGS. 1 and 2, when the bending operation has been completed, the reinforcing insert 26 will be entirely encased within the wall of the fitting. This construction will therefore provide a substantial amount of support to the threaded end 12 against creep, contraction and expansion yet avoid problems of corrosion or contamination which might otherwise be attendant to the use of the metallic insert 26.

The choice of metal used for insert 26 is left to the option of the user. Stronger metals, of course, should be used when the severity or expansion, contraction or compression are increased by, for example, extremely high or low fluid temperatures or interconnection with metallic system components exerting large, radially directed forces.

Having thus described the principles of my invention, it will be obvious that the essential concepts may be employed in other forms not illustrated. It is therefore my desire to be limited only by the scope of the appended claims.

The invention claimed is:

1. A reinforced plastic fitting comprising:
   a sleeve member having first and second ends including connection means;
   a fluid passageway defined in said sleeve member;
   an internal elongated extending recess in the wall defining each end of said sleeve, said recess defined by radially spaced cylindrical surfaces coaxial with the axis about which the respective connection means are defined;
   a radial end wall connecting the respective cylindrical surfaces and defining a bottom for said recess, the opposite end of the recess being open;
   a rigid generally annular reinforcing insert disposed within said recess;
   flap closure means at each end of said sleeve at the open end of each respective recess to close said open end of said recess thereby completely encasing said insert.

2. The improvement of claim 1 wherein said flap closure means is further defined by an axially extending circumferential flap;
   said flap being formed adjacent the open end of each respective recess;
   whereby after insertion of said reinforcing insert in said recess said flap may be folded over said recess and said reinforcing insert and placed in intimate contact with said sleeve.

3. The improvement of claim 2 in which said flap is of a length somewhat greater in magnitude then the radial spacing between said cylindrical surfaces and is defined as a continuation of the portion of the sleeve defining the innermost cylindrical surface.

4. The improvement of claim 2 in which said flap is of a length somewhat greater in magnitude than the radial spacing between said cylindrical surfaces and is defined as a continuation of the portion of the sleeve defining the outermost cylindrical surface.

5. The improvement of claim 1 in which said connection means are defined as externally threaded ends.